United States Patent [19]

Quinn et al.

[11] Patent Number: 5,071,820
[45] Date of Patent: Dec. 10, 1991

[54] CARBONACEOUS MATERIAL WITH HIGH MICROPORE AND LOW MACROPORE VOLUME AND PROCESS FOR PRODUCING SAME

[75] Inventors: David F. Quinn; Jayne A. Holland, both of Kingston, Canada

[73] Assignee: Atlanta Gas Light Company, Atlanta, Ga.

[21] Appl. No.: 529,232

[22] Filed: May 25, 1990

[51] Int. Cl.$^5$ ..................... C01B 31/10; B01J 20/20
[52] U.S. Cl. ................................ 502/434; 502/416; 502/420; 502/433; 502/436; 502/437
[58] Field of Search ............... 502/434, 436, 420, 437, 502/428, 429; 423/445, 449

[56] References Cited

U.S. PATENT DOCUMENTS

| | | | |
|---|---|---|---|
| 3,539,467 | 11/1970 | Bozarth | 502/429 |
| 3,884,830 | 5/1975 | Grant | 502/429 |
| 4,139,416 | 2/1979 | Palumbo et al. | 423/449 |
| 4,526,887 | 7/1985 | Sutt, Jr. | 502/437 |
| 4,528,281 | 7/1985 | Sutt, Jr. | 502/402 |
| 4,540,678 | 9/1985 | Sutt, Jr. | 502/437 |
| 4,738,753 | 4/1988 | Corato et al. | 423/449 |
| 4,880,765 | 11/1989 | Khublauch et al. | 502/420 |

OTHER PUBLICATIONS

Garrido, J. et al., "The Effect of Gasification by Air (623K) or $CO_2$ (1098K) in the Development of Microporosity in Activated Carbons", *J. Chem. Soc., Faraday Trans.* 1, 1987, 83, 1081–1088.

Mahajan, O. P. et al., "Surface-Treated Activated Carbon for Removal of Phenol from Water", *Separation Science and Technology*, 15(10), pp. 1733–1752, 1980.

Barton, S. S. et al., "Surface Studies of Carbon: Acidic Oxides on Spheron 6", Carbon, 1973, vol. 11, pp. 649–654.

*Primary Examiner*—Paul E. Konopka
*Attorney, Agent, or Firm*—Barnes & Thornburg

[57] ABSTRACT

A method which minimizes macropore formation while producing microporous carbon comprises a two stage process. Firstly, the carbon is heated to a temperature in the range of about 150° to about 200° C. in the presence of oxygen for a time in the range of about forty-five to about seventy-five minutes, then purging the reaction environment of oxygen at this temperature with nitrogen. In the second stage, the carbon is heated to a temperature in the range of about 750° to about 900° C. under a stream of nitrogen for a time in the range of about fifteen to forty-five minutes. The process is repeated a number of times, the number being dependent on the extent of microporosity desired.

8 Claims, 11 Drawing Sheets

CARBONACEOUS MATERIAL WITH HIGH MICROPORE AND LOW MACROPORE VOLUME AND PROCESS FOR PRODUCING SAME

This invention relates to the making of carbons having high micropore and low macropore volumes. It is disclosed in the context of natural gas storage, but is believed to have utility in other fields as well.

Practical storage of natural gas for such uses as a vehicle fuel and the like involves portable containerization of the natural gas. In order to maximize the volume of natural gas capable of being stored at a given pressure within a given storage volume, an adsorbent medium for the natural gas is employed. Natural gas, which is primarily methane, is adsorbed in pores and on surfaces of the adsorbent medium. Under such conditions, the adsorbed gas assumes properties not unlike those of its liquid state.

Typical adsorbents are solids with pores and fissures throughout their structure. Methane molecules preferentially adsorb in pores having a diameter of about 10 to 15 Angstroms.

Carbons which have some pore structure and which display some adsorption capabilities can be made more adsorbent by various processes which are collectively referred to as activation. Generally activation is used to describe all of the processes by which the pore structure of the carbon is enhanced. Conventional, non-catalytic, carbon activation processes generally involve heating a carbon substrate to about 450° C. in the presence of a stream of air, or heating the carbon substrate to about 900° C. in the presence of a stream of carbon dioxide or steam. These techniques depend on the activating vehicle, whether it be air, steam or carbon dioxide, reacting with surface carbon atoms and producing carbon monoxide or carbon dioxide, which results in a void on the substrate surface. Continued development of these voids during the activation process results in the carbon becoming more adsorbent.

It is known that pore size is a critical parameter to the adsorption process. For greater adsorption of gases above their critical temperature the adsorbent should be microporous in structure rather than macroporous. Such is the case for methane adsorption at ambient temperatures where greater adsorption is observed using a generally microporous carbon as compared to a predominantly macroporous carbon adsorbent.

Conventional methods of activation are not pore-size specific. Generally using these conventional methods, both the micropore and macropore volume of the carbon substrate increase. The resulting activated carbons have both low packing densities (the amount of adsorbent that can be packed into a unit volume), and low particle densities (the density of a carbon particle measured by mercury displacement at one atmosphere pressure). For those applications in which the volume occupied by the carbon is not a problem, these prior art activated carbons are satisfactory. However, in situations where the volume occupied by the activated carbon, and the number of standard cubic feet of gas it can adsorb per unit volume it occupies, are critical, these prior art activated carbons simply are not efficient enough.

In one prior art technique disclosed in U.S. Pat. No. 4,139,416, air is used as the activating medium in a multi-stage method. The first of these stages is to heat coal in air at 200 to 300° C. for 15 to 120 minutes. This is followed by heating at 400° to 600° C. for 10 to 60 minutes under the residual air to which a percentage of nitrogen had been added, tar produced is condensed from the off gases and a portion of these are recycled. A further stage involves heating to 800° to 1100° C. for 10 to 60 minutes under nitrogen and recycled gas. The resulting carbon had a particle size up to 3 mm and a surface area of up to 300 sq m per g.

In another prior art technique for activating carbon, the carbon was heated in nitrogen to 950° C. and held at that temperature for two hours. This was considered to more or less completely desorb surface oxygen complexes. The carbon was then cooled to 200° C. at which point the nitrogen was replaced by air. Treatment with air proceeded for six hours. It was believed that dissociative chemisorption of oxygen on active carbon sites was more pronounced under these conditions than gasification of the carbon matrix. Following this oxidation step, the air was replaced by nitrogen and the cycle repeated. The cycle was carried out thirty five times at the end of which a cumulative weight loss of 31% was reported for the carbon. The resulting carbon was found to have increased in surface area when measured by nitrogen but had not increased at all when measured using carbon dioxide. No measurement of the micropore or macropore volume was given.

It is an objective of the present invention to provide a method for producing adsorbent materials of large piece size which have a low macropore volume in conjunction with a large micropore volume that are suitable for adsorption of methane or like molecules.

According to the inventive process, carbon, produced, for example, by the pyrolysis of coal, cellulosic material or a polymer, is treated by a two stage process. In the first stage of the process, it is heated to 200° C. or less, usually around 180° C., in a stream of air for about one hour. Oxygen is considered to be chemisorbed by surface carbon atoms and carbon-oxygen surface complexes are formed. After the elapsed time, the air stream is replaced by a stream of nitrogen to purge the system of any oxygen. The second stage of the process is to then raise the temperature of the system to 800°–850° C. and hold at that temperature for thirty minutes or so. The purpose of this higher temperature treatment is to remove the surface carbon-oxygen complex from the carbon by the evolution of carbon monoxide or carbon dioxide. This results in voids in the carbon surface which develop into micropores in the carbon matrix. In this treatment, the carbon mass is typically reduced by about one percent. An increase in activation, as determined by a measured increase in micropore volume and surface area, accompanies this weight loss.

For the production of a carbon with a large micropore volume, an activation with more than a one percent weight loss is desirable and so the above described procedure is repeated a number of times. Each time it is repeated, a further increase in micropore volume is achieved. Thus the extent of activation can be controlled by the number of times the process is repeated. This, of course, is limited to the point where there are insufficient carbon atoms forming the matrix to keep the matrix coherent. Beyond such a point, the microporous substrate collapses coincident with the formation of large internal voids in the matrix.

A major advantage of this inventive activation method is that it is much more suitable for treating larger monolithic pieces of carbon. Prior art activation using air, steam or carbon dioxide at one temperature, wherein the stream of gas reacts with the immediate outer surface of the carbon before the molecules can diffuse into the core of the monolith, results in an inhomogeneously activated carbon with many large macropores. Because of this characteristic, currently all commercially produced activated carbons are either granular, powdered or limited to narrow diameter extrudates. The exposure of the carbon at low temperature in the present invention, permits reacting gas molecules to be chemisorbed much more uniformly throughout a carbon monolith.

Preliminary results have shown that the method of the present invention results in macropore volume twenty percent less than with prior art activation processes, and results in piece density fifteen percent greater than activated carbons made by prior art steam activation processes for coal carbons.

Monolithic pieces of PVDC carbon activated using the inventive process remained hard and dense (0.86 g/mL). This carbon stored more methane than any carbon activated by any other process measured during recent trials. At 300 psia and 25° C., it stored 152 standard cubic feet (SCF) of methane per cubic foot of monolith volume and yielded a delivered volume (the actual volume of methane that can be recovered from a storage medium when the pressure is reduced to one atmosphere) of 118 SCF per cubic foot of monolith volume. At 500 psia and 25° C., it stored 170 SCF of methane per cubic foot of monolith volume and provided a delivered volume of 135 SCF per cubic foot.

Further advantages of the activation process of the present invention are that it does not require any chemicals other than those presently used for prior art activation processes and are abundantly available, such as air and nitrogen. Additionally, there is no waste disposal problem, and finally it poses no environmental hazards.

The invention may best be understood by referring to the following detailed description of illustrative embodiments of the invention and the accompanying drawings which illustrate the invention. In the drawings.

Figure 19:
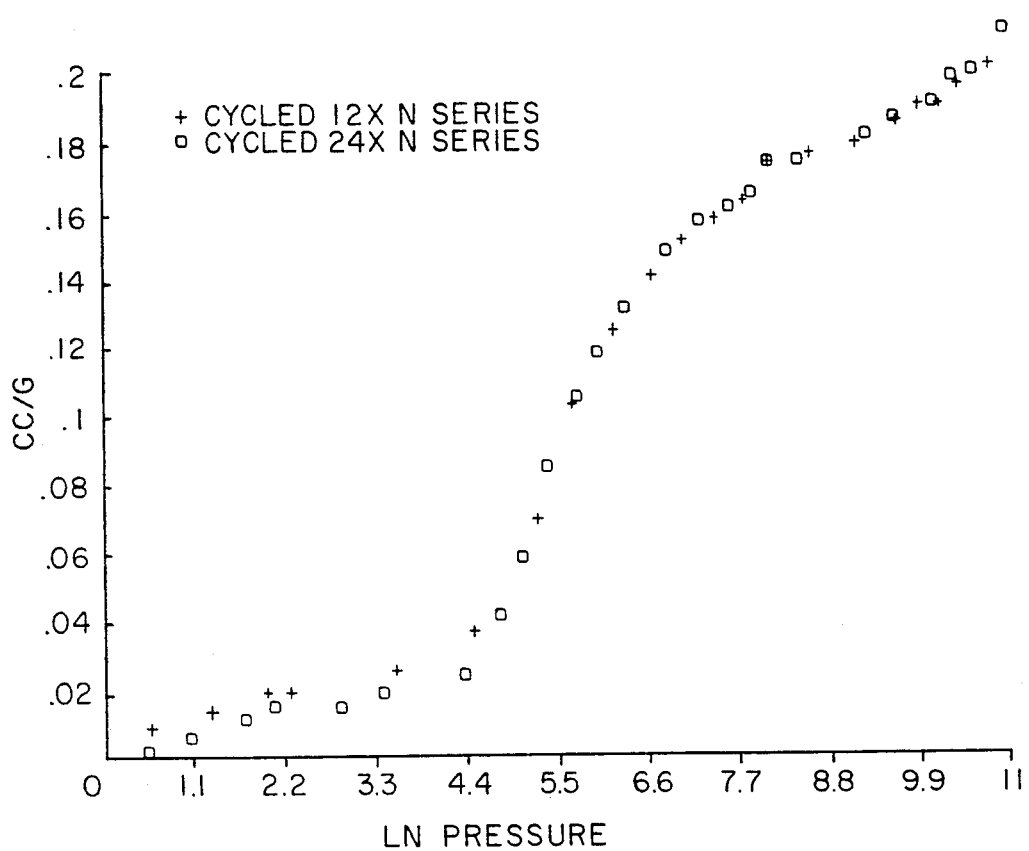
Figure 20:
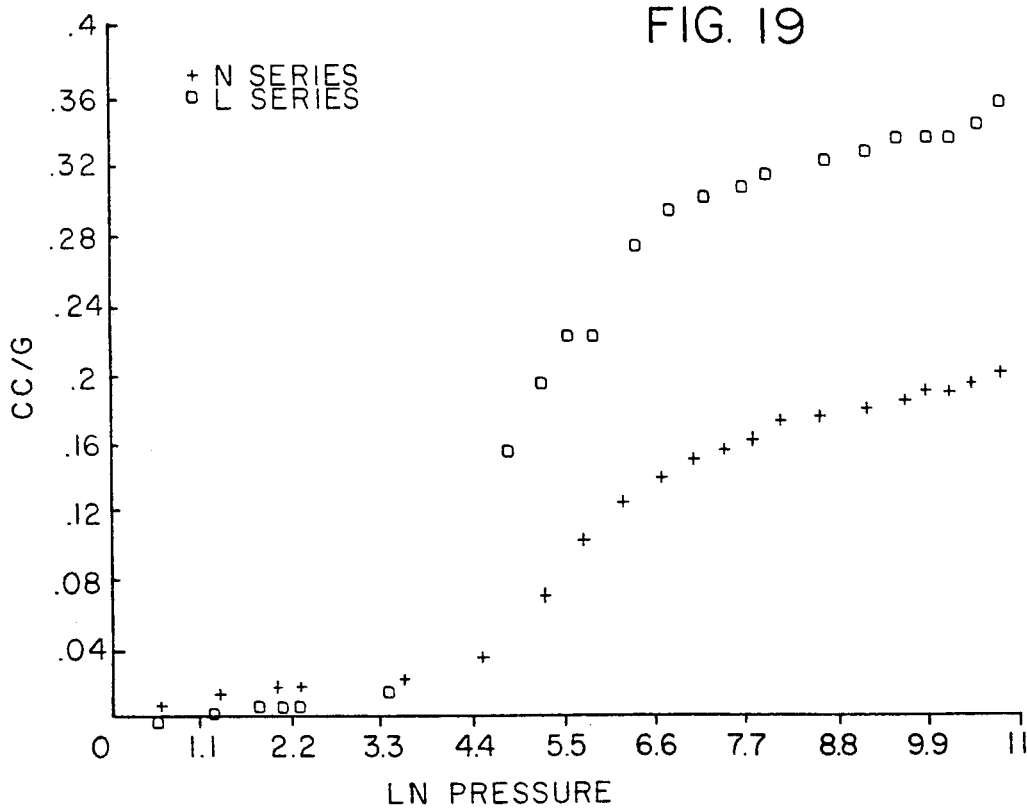
Figure 21:
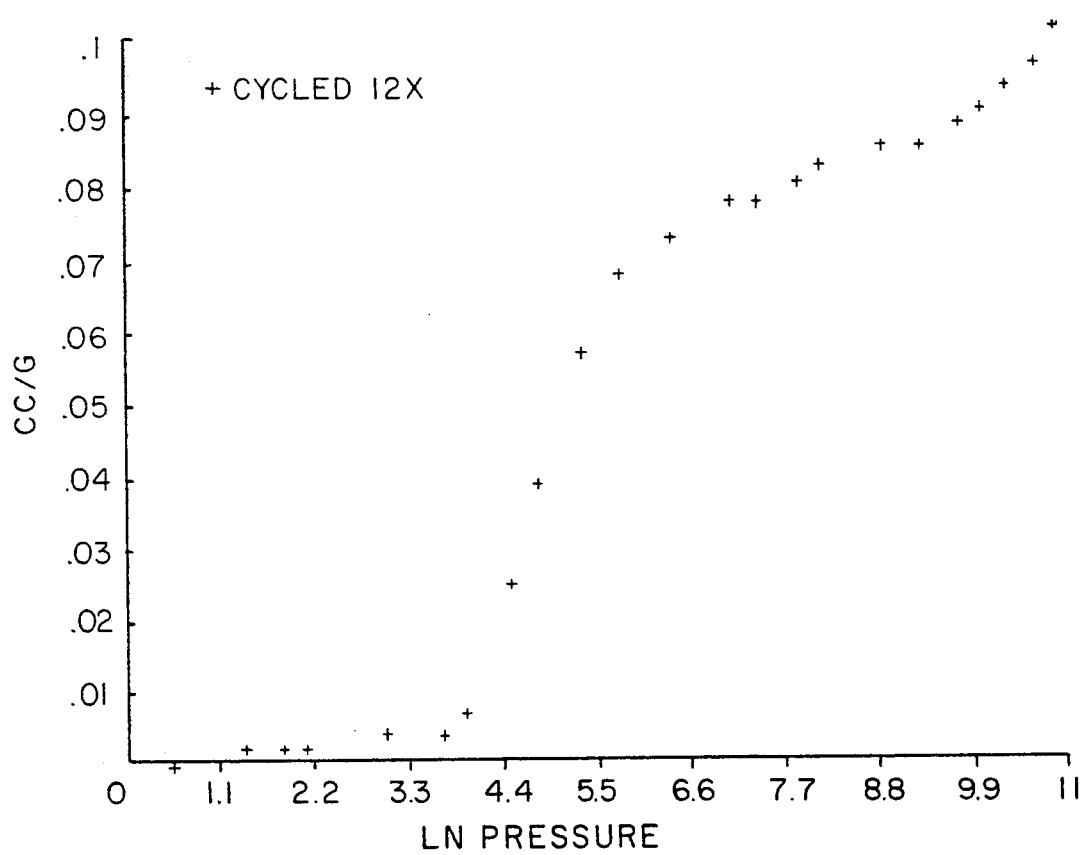

FIG. 19 compares mercury porosimetry in cubic centimeters of macropore and mesopore volume per gram of two different groups of peach pit pellets treated as described in Example 3 as a function of the natural logarithm of mercury pressure;

FIG. 20 compares mercury porosimetry in cubic centimeters of macropore and mesopore volume per gram of two different series of peach pit pellets treated as described in Example 3 as a function of the natural logarithm of mercury pressure; and, FIG. 21 illustrates mercury porosimetry in cubic centimeters of macropore and mesopore volume per gram of a series of cherry stone carbon pellets treated as described in Example 3 as a function of the natural logarithm of mercury pressure.

CHARACTERIZATION OF CARBON ADSORBENTS

All carbon samples discussed herein regardless of what their precursors, pyrolysis or activation treatments, were subjected to the same characterization experiments.

Where specifically shaped carbon pieces were made, a packing density could not be obtained, but a piece density was calculated from the weight and measured outer volume of the sample.

Mercury porosimetry measurements at pressures up to 60000 psi were used to calculate macropore ($>500\text{Å}$) and mesopore ($500\text{Å}-30\text{Å}$) volume and to measure and the piece and other densities of the carbon samples. The mercury porosimetry experiment gives several useful pieces of information about a carbon sample.

A low temperature (77K) nitrogen isotherm was measured, from which the micropore volume and surface area were calculated using the Dubinin and BET equations, respectively.

A methane isotherm at 25° C. for pressures to 1000 psia was measured to determine the performance of the carbon as an adsorbent of natural gas. From this mass-based isotherm and a packing density or piece density, estimations were calculated for the storage capacity and amount of gas which would be delivered per unit volume of absorbent.

The one atmosphere density can be taken as the piece density of a granule or particle of the carbon. It is measured by evacuating a sample and then surrounding the particles with mercury at a pressure of one atmosphere. This allows the mercury to fill the void space between the particles but is not a high enough pressure to force the mercury into even the larger macropore of the carbon. This is an important density since it allows an extrapolation to be made as to how a monolithic piece of this carbon would perform. If the sample has a specific geometric shape, e.g. a cylinder, then its dimensions can be measured and a volume calculated. The weight of this specimen and its volume will give a piece density which we often refer to as a geometric density.

The 60000 psi density is the density of the carbon including its micropores. At this pressure the mercury is considered to have filled all macropores and mesopores of diameter $>30\text{Å}$ (3 nm).

From this mercury porosimetry experiment wherein the pressure on the mercury surrounding the carbon is gradually increased, a plot of pressure versus the volume penetrated by the mercury is obtained. This gives macropore and mesopore volumes, as well as a pore size distribution for pore diameters from 0.1 mm down to $30\text{Å}$. Pores within this size range are too large to contribute to methane adsorption at ambient temperatures to any extent. Thus, as a general rule, carbons which have large macropore volumes are unlikely to be good candidates for high methane adsorption per unit volume of adsorbent.

An external surface area can also be calculated from the mercury porosimetry plot. For porous carbons this is usually small when compared to the total surface area. It is, however, sometimes useful to compare values of external surface area for a series of carbons which have been subjected to successive activation. Any increasing trend in this value would suggest that carbon was being removed from the exterior surfaces of a sample, rather than internally to form micropores, a detrimental effect for this application.

It should be noted that mercury porosimetry gives no information about micropores. Since these are the pores that are critical for the adsorption of methane, a low temperature nitrogen adsorption experiment is carried out to evaluate the extent of the micropores in the various carbon samples.

When nitrogen is adsorbed by carbons, it is adsorbed mainly in the micropores. By carrying out a low (77K) temperature nitrogen isotherm, the measured amount of adsorbed nitrogen can be related to the surface area or to the micropore volume of the carbon. This measurement is an extremely good indicator of potential methane adsorption because the nitrogen and methane molecules are similar to each other, both in behavior and in size.

When the BET surface area is plotted versus methane adsorbed at 300 psia for a number of different carbons, a reasonably linear relationship is found. A similar correlation is obtained when the Dubinin micropore volume is plotted against methane adsorbed. Therefore a carbon adsorbent with a large micropore volume or surface area is likely to show high adsorption of methane. Because carbons are irregular in shape, these volumes and surface areas are traditionally quoted per unit mass of adsorbent. Since our primary objective is to achieve maximum adsorption per unit of storage volume, it is necessary to compare the surface areas or micropore volumes of carbons per unit volume. This is done by multiplying the area or micropore volume by the piece densities (measured at one atmosphere) of the carbons. The assumption made here is that a carbon sample is a monolithic piece. Any void volume which may occur in packing is not considered.

The methane adsorption results are determined on a mass basis and have also been converted to a unit volume using the one atmosphere (piece) density.

The predicted delivery subtracts the amount of gas which is held by the carbon at one atmosphere from the amount of gas adsorbed at a given pressure. Again, voids have been neglected. Values are quoted in standard cubic feet (SCF) per cubic foot of carbon. The carbons which show the highest predicted deliveries are the ones which have high surface areas per unit volume.

In practice there will also be a certain amount of gas in the gas phase (not adsorbed) in the macropore volume of the carbon. This gas will be released when the pressure is reduced and this will increase the amount delivered over the predicted delivery value; by how much is difficult to predict, and will vary from carbon to carbon. However, it is often in the region of ten percent. This amount will be greater for carbons with substantial macropore volumes, but these carbons are unlikely to be good adsorbents of natural gas from a volume standpoint.

EXAMPLE 1

Cyclic Activation of Peach Pits

Originally peach pits were pyrolyzed in their natural state. The resulting carbon was quite dense (1.06 g/ml) but had a low adsorption capacity. The lack of a large macropore volume in this carbon made it a desirable candidate for activation.

This peach pit carbon in its natural state (i.e. still in the form of a pit) was used for cyclic activation. This procedure involved aerating the sample at 180° C. followed by a heating step to 850° C. under a flow of nitrogen. Each time this was done, one cycle was considered completed. The samples were cycled many times and the entire process was quite time consuming.

Figure 1:
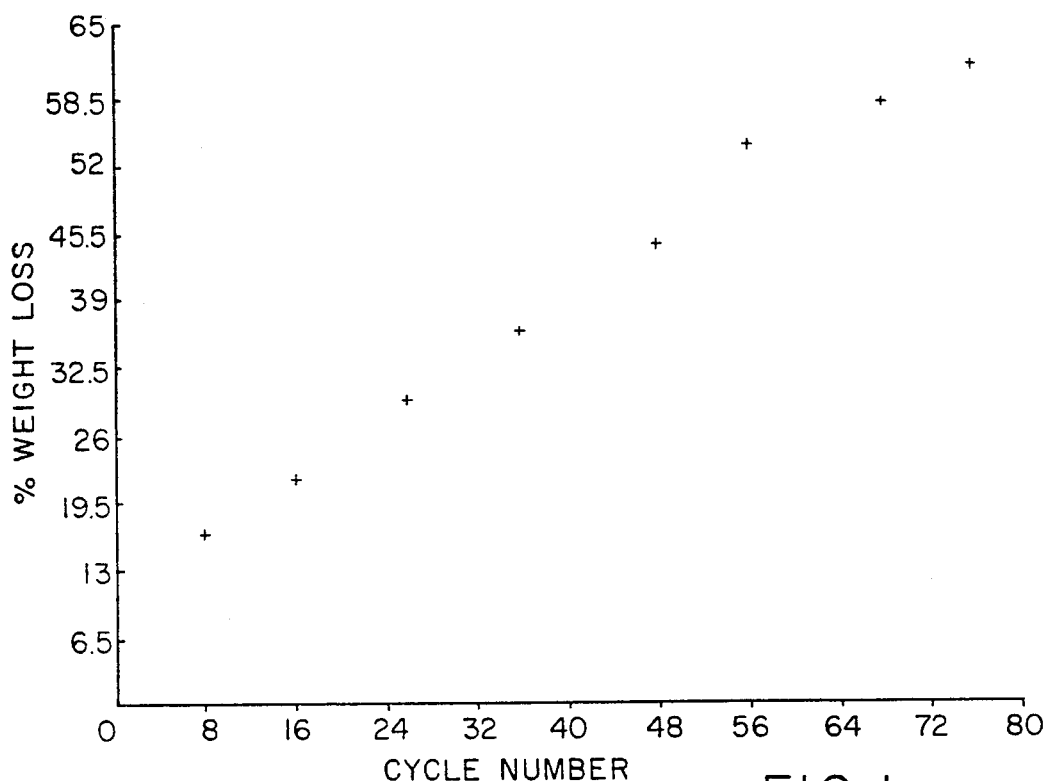
FIG. 1 illustrates the percentage weight loss as a function of the number of cycles of the inventive process carried out on carbon obtained by the pyrolysis of whole peach pits.

For example, the peach pits were cycled seventy six times (76×) with representative samples removed and characterized at various stages. FIG. 1 illustrates the percentage weight loss with number of cycles. This plot illustrates relatively good linearity after the first eight cycles. Initially a greater weight loss was observed, which may have been due to the loss of volatiles remaining after pyrolysis. After eight cycles, less than one percent weight loss occurred with each successive cycle. The total weight loss after seventy six cycles was about sixty one percent. All these samples retained their original shape and still looked like black, carbonaceous peach pits even after high weight losses, although they had shrunk in volume. There did appear to be some loss in mechanical strength compared to the original unactivated carbon, but this was to be expected.

Table 1 contains the mercury porosimetry data for all the cycled peach pits. Inconsistencies do exist, and may be attributable to the fact that the naturally occurring starting material was not completely homogeneous. The positive aspects of these results include the retention of a fairly high piece density (0.80 g/ml) even at a high percentage weight loss.

Mesopores were present to some extent in the original material and there is a slight increase in pore volume in this size region (500Å-30Å).

Figure 3:
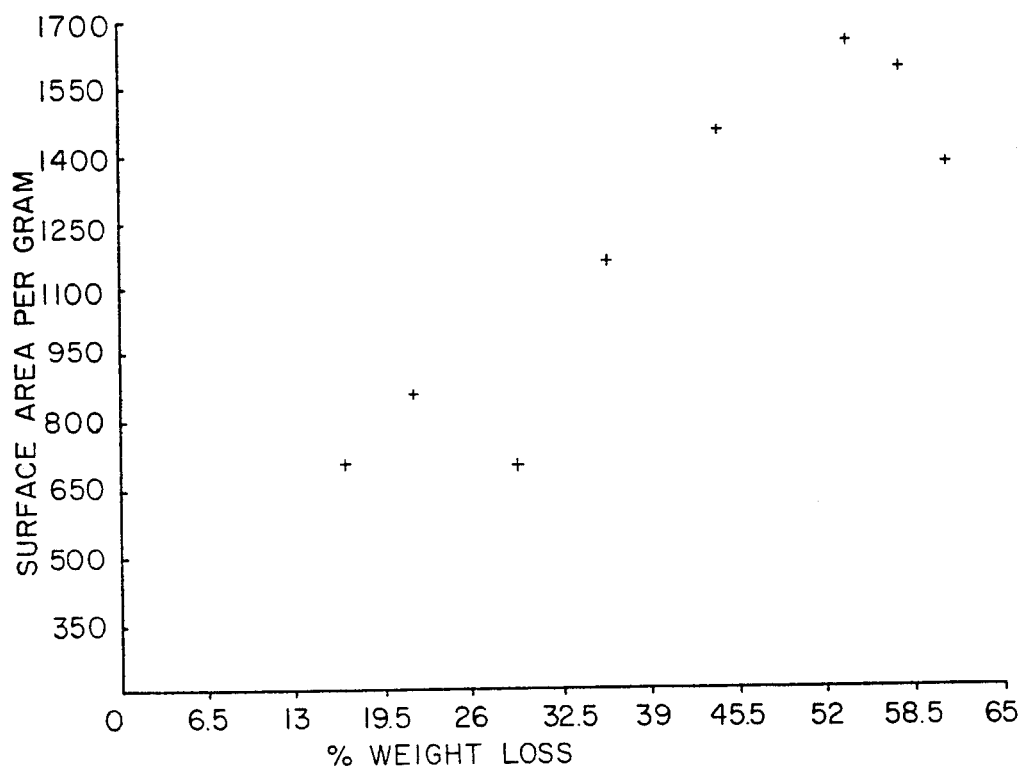
FIG. 3 illustrates surface area (in sequence meters) per unit mass (in grams) as a function of percentage weight loss for the activated peach pi carbon of Example 1.
Figure 4:
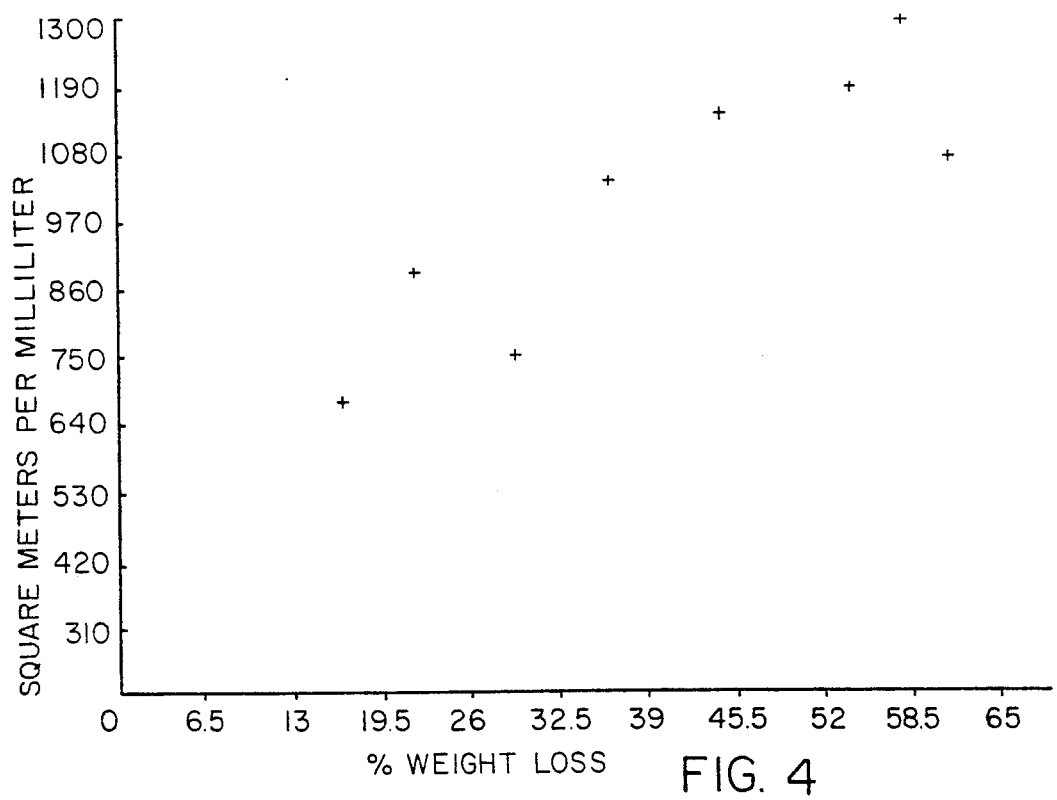
FIG. 4 illustrates surface area (in square meters) per unit volume (in milliliters) as a function of percentage weight loss for the activated peach pit carbon of Example 1.

Table 2 lists the nitrogen isotherm data for these cycled carbons. The surface area per gram as a function of the weight loss is plotted in FIG. 3. This graph illustrates that the available surface area increases with weight loss, but seems to reach a maximum after fifty six cycles, or fifty four percent weight loss, after which there is a slight decrease. On a per volume basis, as illustrated in FIG. 4, this decrease is less pronounced. Scatter is probably due to inhomogeneity among the samples tested.

TABLE 2

Cyclic Activation Peach Pit Carbon

|  | BET SURFACE AREA $m^2/g$ | DUBININ MICROPORE VOLUME ml/g | 1 ATMOS. DENSITY Hg g/ml | SURFACE AREA per unit volume $m^2/ml$ |
|---|---|---|---|---|
| 8X-16.7% w/l | 722 | 0.31 | 0.94 | 680 |
| 16X-21.9% w/l | 876 | 0.38 | 1.02 | 894 |
| 26X-29.4% w/l | 705 | 0.30 | 1.06 | 750 |
| 36X-36.3% w/l | 1171 | 0.51 | 0.89 | 1042 |
| 48X-44.6% w/l | 1460 | 0.60 | 0.79 | 1153 |
| 56X-54.1% w/l | 1654 | 0.71 | 0.72 | 1190 |
| 68X-57.9% w/l | 1584 | 0.64 | 0.82 | 1300 |
| 76X-61.3% w/l | 1371 | 0.56 | 0.78 | 1070 |
| 76X (HCl washed) | 1671 | 0.70 | 0.81 | 1354 |

TABLE 1

Cyclic Activation Peach Pit Carbon

| TREATMENT | DENSITIES 1 ATMOS. g/ml | DENSITIES 60000 psi g/ml | TOTAL MACROPORE and MESOPORE VOLUME ml/g | MACROPORE VOLUME >500 A° ml/g | MESOPORE VOLUME 500-30 A° ml/g | EXTERNAL SURFACE AREA $m^2/g$ | EXTERNAL SURFACE AREA $m^2/ml$ |
|---|---|---|---|---|---|---|---|
| 8X-16.7% w/l | 0.94 | 1.18 | 0.21 | 0.03 | 0.18 | 180 | 169 |
| 16X-21.9% w/l | 1.02 | 1.18 | 0.13 | 0.03 | 0.10 | 94 | 96 |
| 26X-29.4% w/l | 1.06 | 1.22 | 0.12 | 0.02 | 0.10 | 105 | 111 |
| 36X-36.3% w/l | 0.89 | 1.15 | 0.26 | 0.05 | 0.21 | 170 | 151 |
| 48X-44.6% w/l | 0.79 | 1.04 | 0.31 | 0.05 | 0.26 | 173 | 137 |
| 56X-54.1% w/l | 0.72 | 1.08 | 0.45 | 0.05 | 0.40 | 250 | 180 |
| 68X-57.9% w/l | 0.82 | 1.11 | 0.32 | 0.05 | 0.27 | 188 | 154 |
| 76X-61.3% w/l | 0.78 | 1.04 | 0.32 | 0.06 | 0.26 | 205 | 160 |
| 76X (HCl washed) | 0.81 | 1.09 | 0.32 | 0.06 | 0.26 | 194 | 157 |

Figure 2:
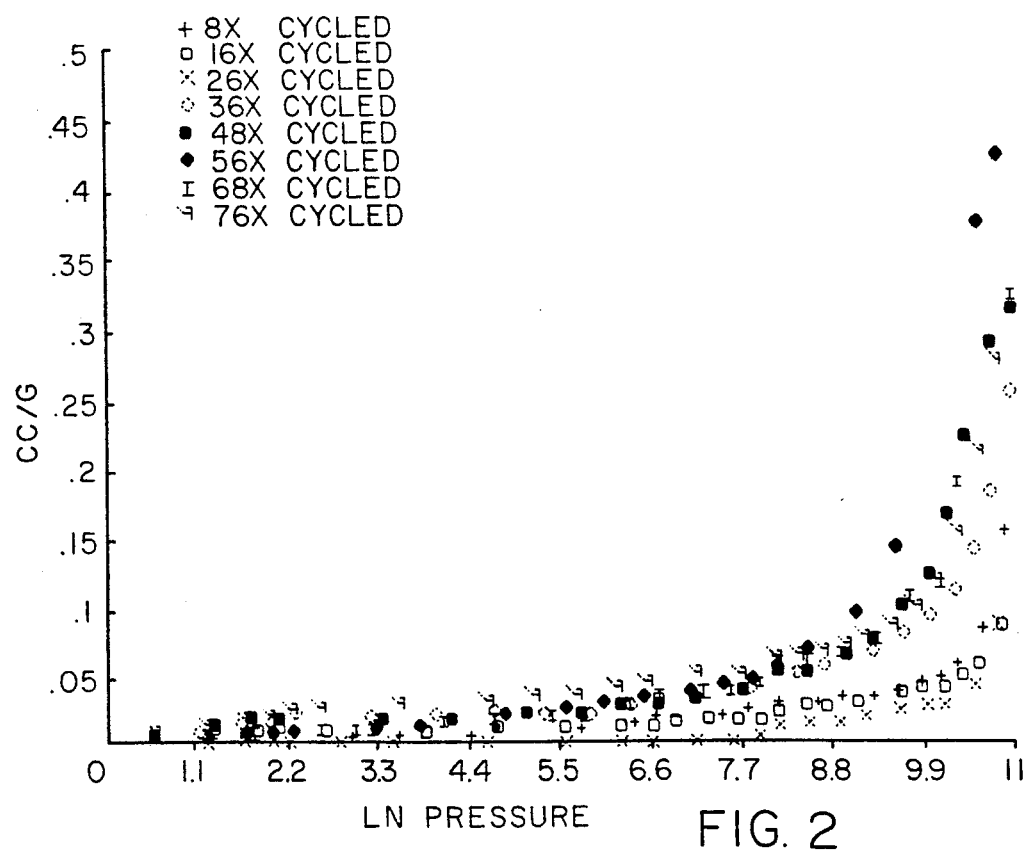
FIG. 2 illustrates mercury porosimetry data on the activated peach pit carbon of Example 1, plotted as cubic centimeters per gram versus the natural logarithm of mercury pressure.

The increase in total macropore volume with weight loss is small with few pores being created of diameter greater than 50 nanometers (macropores). The actual mercury porosimetry plots are illustrated in FIG. 2.

Figure 5:
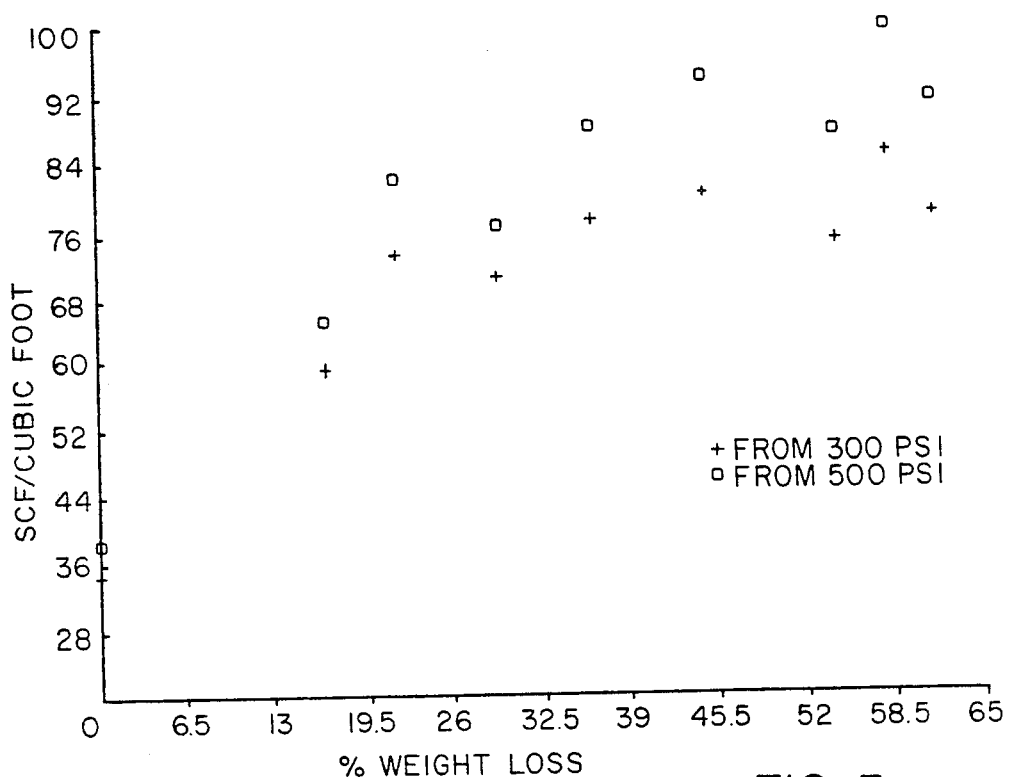
FIG. 5 illustrates the methane adsorption capacity (in standard cubic feet) per cubic foot of activated peach pit carbon as a function of percentage weight loss for the activated peach pit carbon of Example 1.

Table 3 illustrates the methane isotherm data for these samples. Initially the adsorption capacity increases and then levels off. After the sample was cycled thirty six times or more, the predicted delivery of methane did not demonstrate as great an increase. This is illustrated in FIG. 5.

TABLE 3

Cyclic Activation Peach Pit Carbon Methane Adsorption

| Treatment | Per Unit Mass grams methane per gram carbon 300 psia | Per Unit Mass grams methane per gram carbon 500 psia | Per Unit Volume grams methane per ml carbon 300 psia | Per Unit Volume grams methane per ml carbon 500 psia | Predicted Delivery $SCF/ft^3$ 300 psia | Predicted Delivery $SCF/ft^3$ 500 psia |
|---|---|---|---|---|---|---|
| 8X-16.7% w/l | 0.063 | 0.067 | 0.059 | 0.063 | 60 | 66 |
| 16X-21.9% w/l | 0.068 | 0.074 | 0.069 | 0.075 | 74 | 83 |
| 26X-29.4% w/l | 0.063 | 0.067 | 0.067 | 0.071 | 71 | 77 |
| 36X-36.3% w/l | 0.079 | 0.087 | 0.070 | 0.077 | 78 | 89 |
| 48X-44.6% w/l | 0.086 | 0.097 | 0.068 | 0.077 | 81 | 95 |
| 56X-54.2% w/l | 0.087 | 0.098 | 0.063 | 0.071 | 75 | 88 |
| 68X-57.9% w/l | 0.088 | 0.100 | 0.072 | 0.082 | 86 | 101 |
| 76X-61.3% w/l | 0.085 | 0.096 | 0.066 | 0.075 | 78 | 92 |

TABLE 3-continued

Cyclic Activation
Peach Pit Carbon
Methane Adsorption

|  | Per Unit Mass grams methane per gram carbon | | Per Unit Volume grams methane per ml carbon | | Predicted Delivery SCF/ft³ | |
|---|---|---|---|---|---|---|
| Treatment | 300 psia | 500 psia | 300 psia | 500 psia | 300 psia | 500 psia |
| 76X (acid washed) | 0.088 | 0.099 | 0.071 | 0.080 | 84 | 98 |

Figure 6:
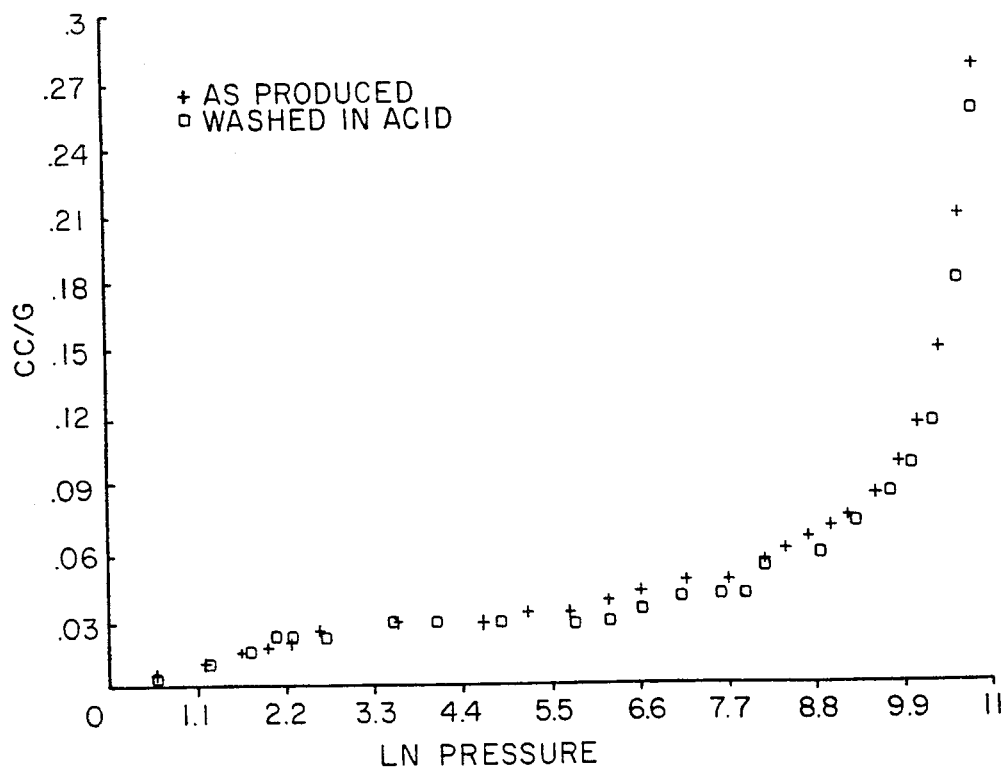
FIG. 6 illustrates mercury porosimetry data for the cycled 76 times activated peach pit carbon of Example 1, unwashed and washed, plotted as cubic centimeters per gram versus the natural logarithm of pressure.
Figure 7:
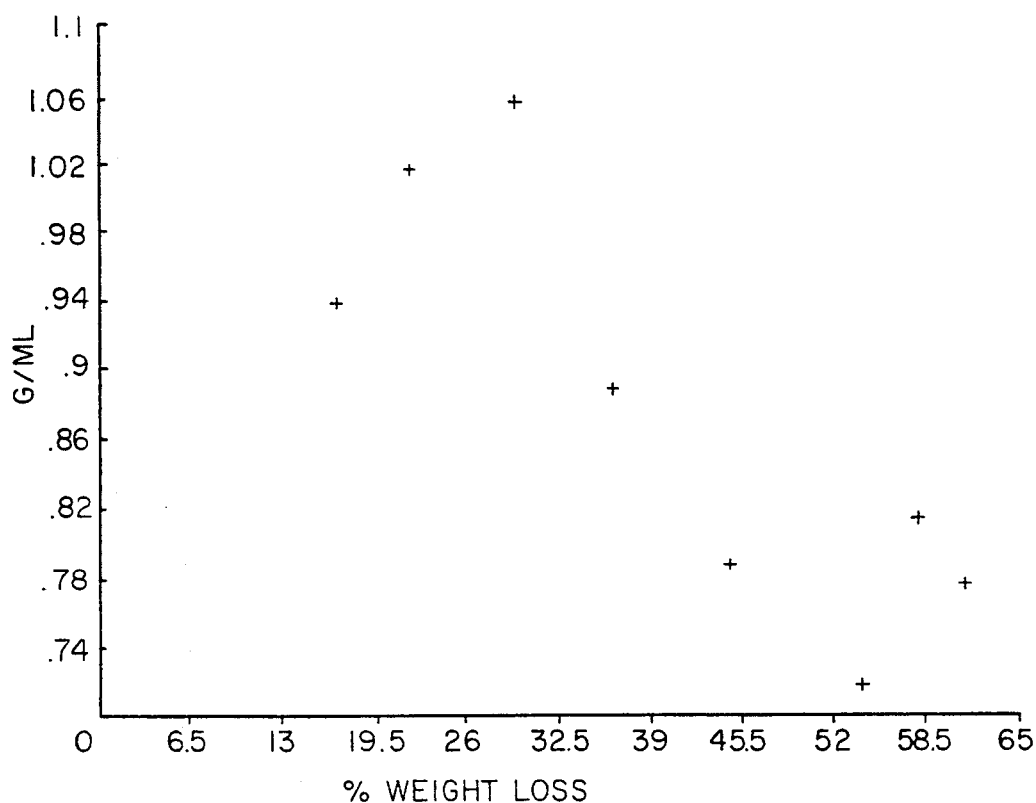
FIG. 7 illustrates density, in grams per milliliter as a function of percentage weight loss for the activated peach pit carbon of Example 1.
Figure 8:
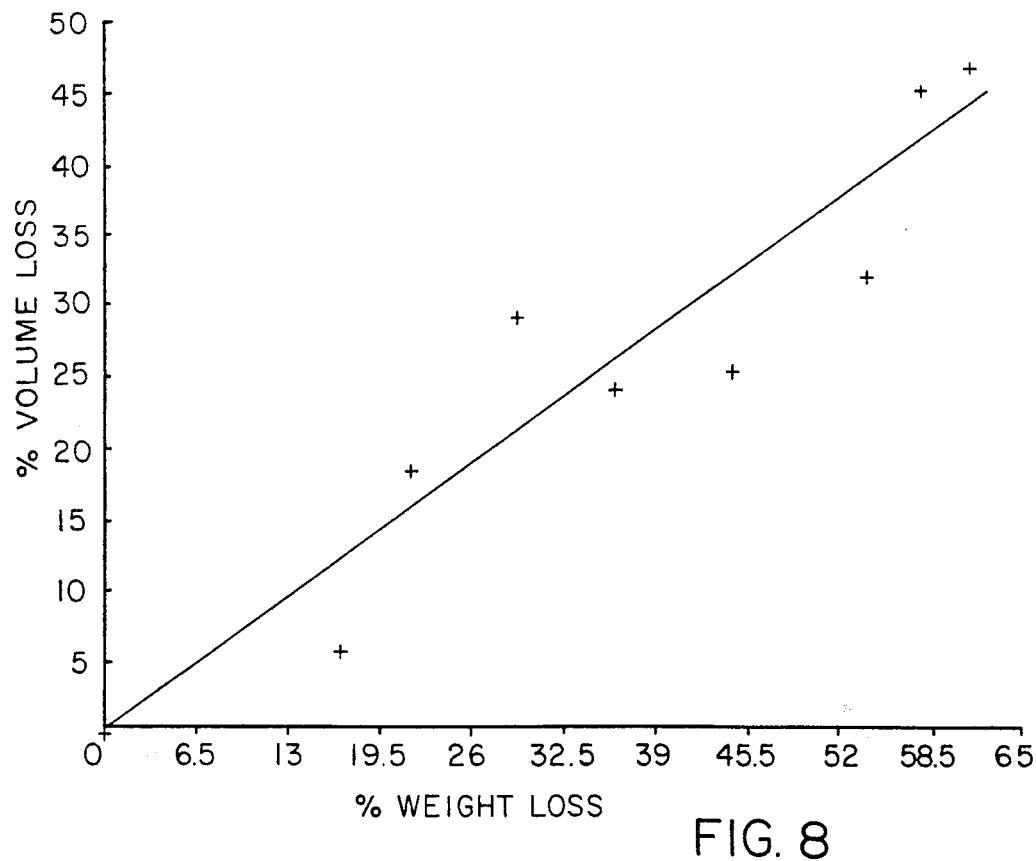
FIG. 8 illustrates percentage volume loss as a function of percentage weight loss for the activated peach pit carbon of Example 1.
Figure 9:
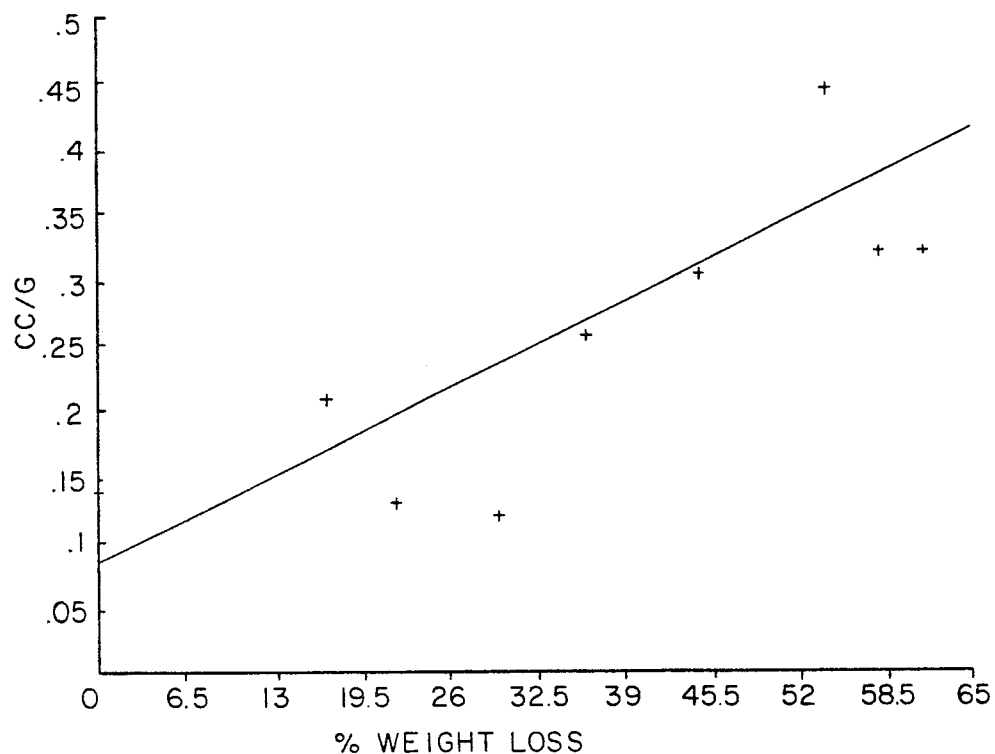
FIG. 9 illustrates macropore volume in cubic centimeters per gram of sample treated as discussed in Example 1 plotted as a function of percentage weight loss of the sample.

The peach pit carbon which had been cycled seventy-six times was washed with dilute hydrochloric acid and re-characterized. The washed sample showed a slight increase in adsorption potential while the mercury porosimetry plot, and therefore the macropore volume, remained unchanged (see FIG. 6). This suggests that some residual surface oxides or ash were present in the original cycled sample which could be removed in the washing procedure. The results for the washed sample have been included in Tables 1-3.

The maximum predicted methane delivered from any of these cycled samples was 86 SCF/cu ft from 300 psi and 101 SCF/cu ft from 500 psi.

EXAMPLE 2

Cyclic Activation of Coal

Figure 10:
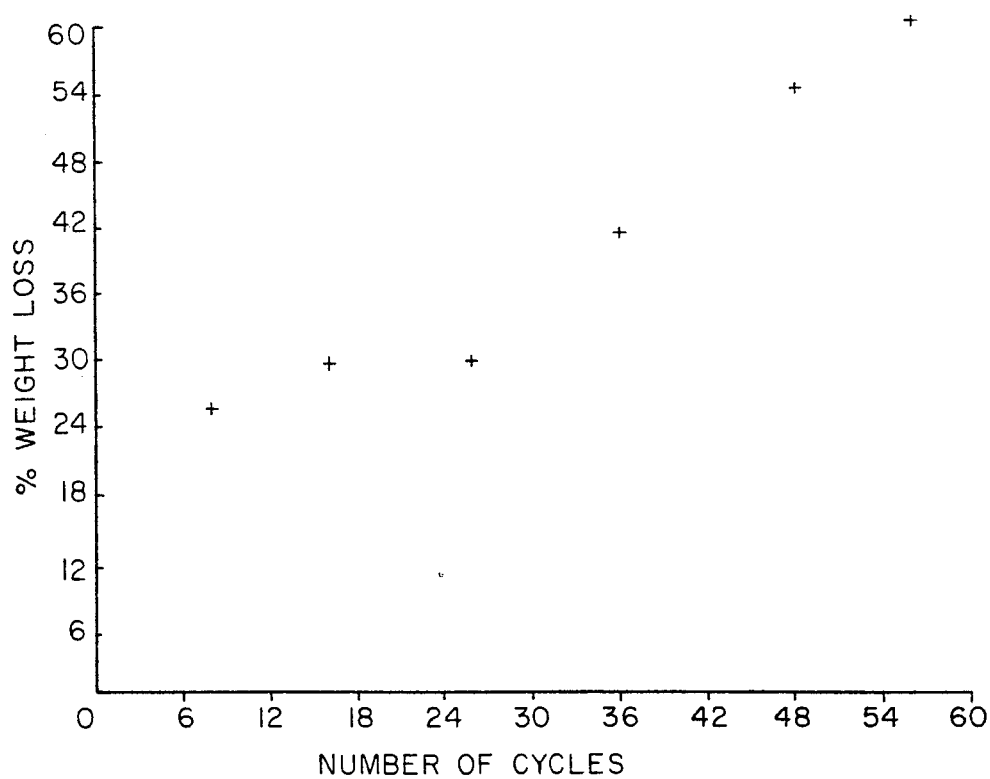
FIG. 10 illustrates the percentage of weight loss as a function of the number of cycles of Example 2.

A carbonized but not activated coal briquette from Sutcliffe Speakman, a British supplier, was used in this example. This coal was cycled as previously described. Again the weight loss versus number of cycles completed shows a reasonably linear relationship after the first eight cycles. This is illustrated in FIG. 10. In the initial stages of cycling, the weight loss was high, indicating a loss of volatiles. After completion of the first eight cycles, the weight loss was less than one percent per cycle. The final weight loss of the coal was 61% after the completion of 56 cycles.

Figure 11:
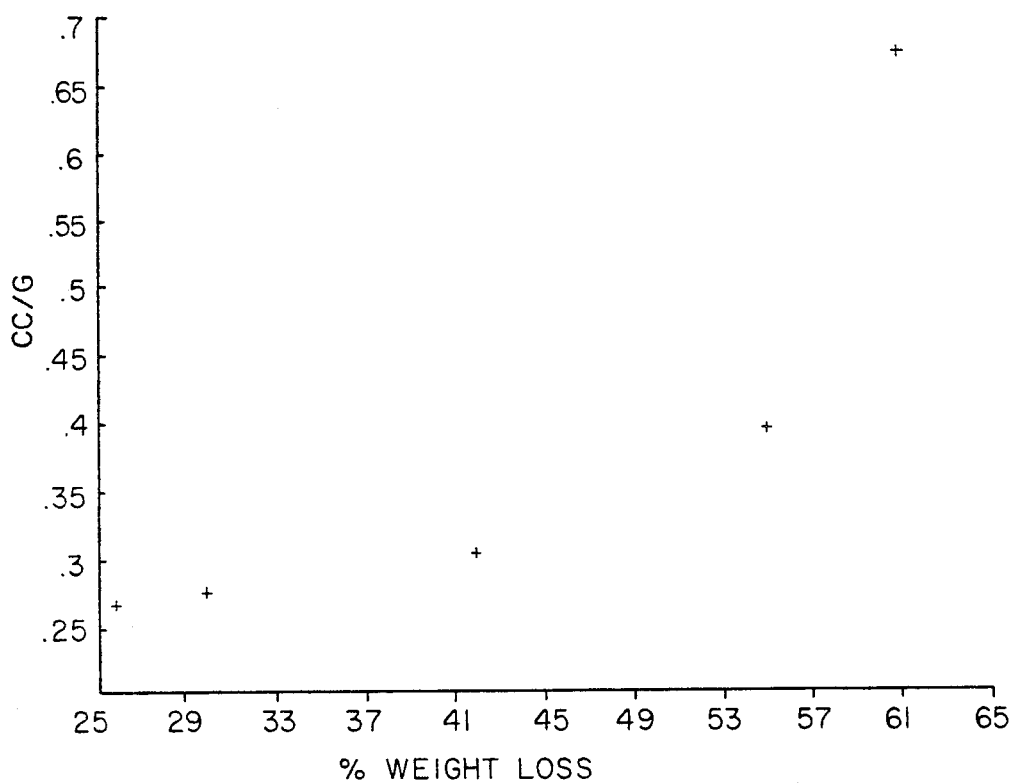
FIG. 11 illustrates macropore volume in cubic centimeters per gram of sample treated as discussed in Example 2 plotted as a function of percentage weight loss of the sample.
Figure 12:
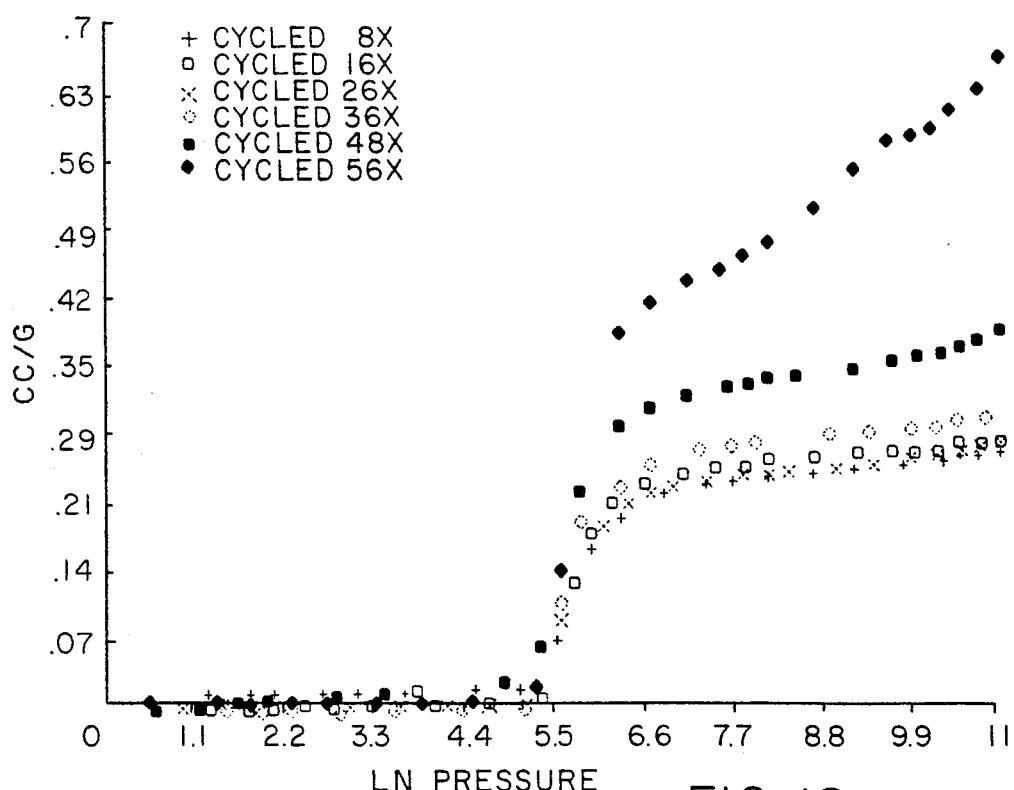
FIG. 12 illustrates mesopore volume in cubic centimeters per gram of sample treated as discussed in Example 2 plotted as a function of the natural logarithm of the mercury pressure.

Table 4 contains the mercury porosimetry data for the cycled samples. The initial coal had a fairly large macropore volume with a pore diameter about 0.65 microns (very large) and this was retained in all the cycled samples. FIG. 11 illustrates the relationship between weight loss and total macropore volume. The mesopore volume of the original coal was small and did not show an increase until many cycles had been completed. The plots illustrating this are in FIG. 12.

TABLE 4

Cyclic Activation
Coal

| TREATMENT | DENSITIES | | TOTAL MACROPORE and MESOPORE VOLUME ml/g | MACROPORE VOLUME >500 A° ml/g | MESOPORE VOLUME 500-30 A° ml/g | EXTERNAL SURFACE AREA | |
|---|---|---|---|---|---|---|---|
|  | 1 ATMOS. g/ml | 60000 psi g/ml |  |  |  | m²/g | m²/ml |
| 8X-25.8% w/l | 0.99 | 1.35 | 0.27 | 0.25 | 0.02 | 15 | 15 |
| 16X-29.9% w/l | 1.04 | 1.48 | 0.28 | 0.26 | 0.02 | 14 | 15 |
| 26X-30.0% w/l | 0.99 | 1.38 | 0.28 | 0.25 | 0.02 | 23 | 21 |
| 36X-41.9% w/l | 1.00 | 1.44 | 0.31 | 0.28 | 0.03 | 20 | 20 |
| 48X-55.0% w/l | 0.91 | 1.42 | 0.40 | 0.35 | 0.05 | 34 | 31 |
| 56X-61.0% w/l | 0.60 | 1.02 | 0.68 | 0.49 | 0.19 | 101 | 61 |

TABLE 5

Cyclic Activation
Coal

| CARBON | BET SURFACE AREA m²/g | DUBININ MICROPORE VOLUME ml/g | 1 ATMOS. DENSITY Hg g/ml | SURFACE AREA per unit volume m²/ml |
|---|---|---|---|---|
| 8X-25.8% w/l | 586 | 0.25 | 0.99 | 580 |
| 16X-29.9% w/l | 599 | 0.29 | 1.04 | 623 |
| 26X-30.0% w/l | 646 | 0.31 | 0.99 | 640 |
| 36X-41.9% w/l | 795 | 0.33 | 1.00 | 795 |
| 48X-55.0% w/l | 1095 | 0.44 | 0.91 | 996 |
| 56X-61.0% w/l | 1266 | 0.52 | 0.60 | 760 |

Figure 13:
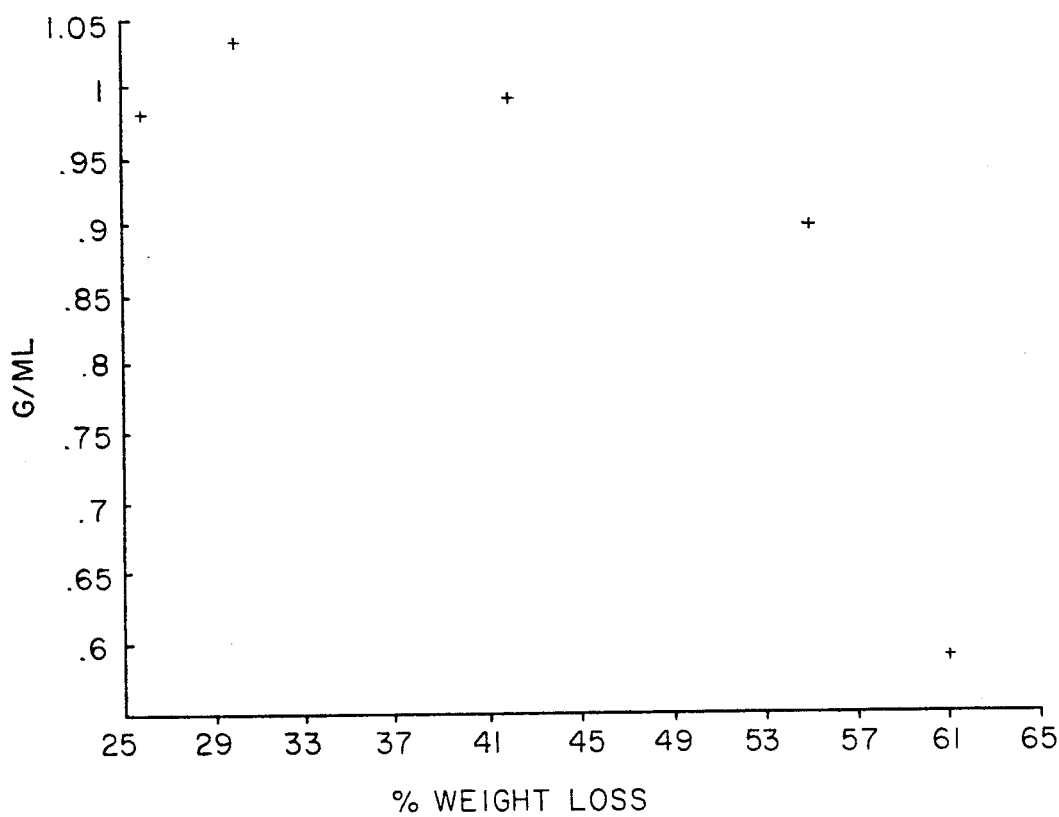
FIG. 13 illustrates the bulk density (measured at one atmosphere pressure) in grams per millimiter of a sample prepared according to Example 2 as a function of the percentage weight loss of the sample.

The bulk density of the coal did not decrease until after 36 cycles had been completed, and the coal retained its shape and mechanical strength up to this point. The bulk (one atmosphere) densities versus weight loss for the cycled coal are illustrated in FIG. 13.

Figure 14:
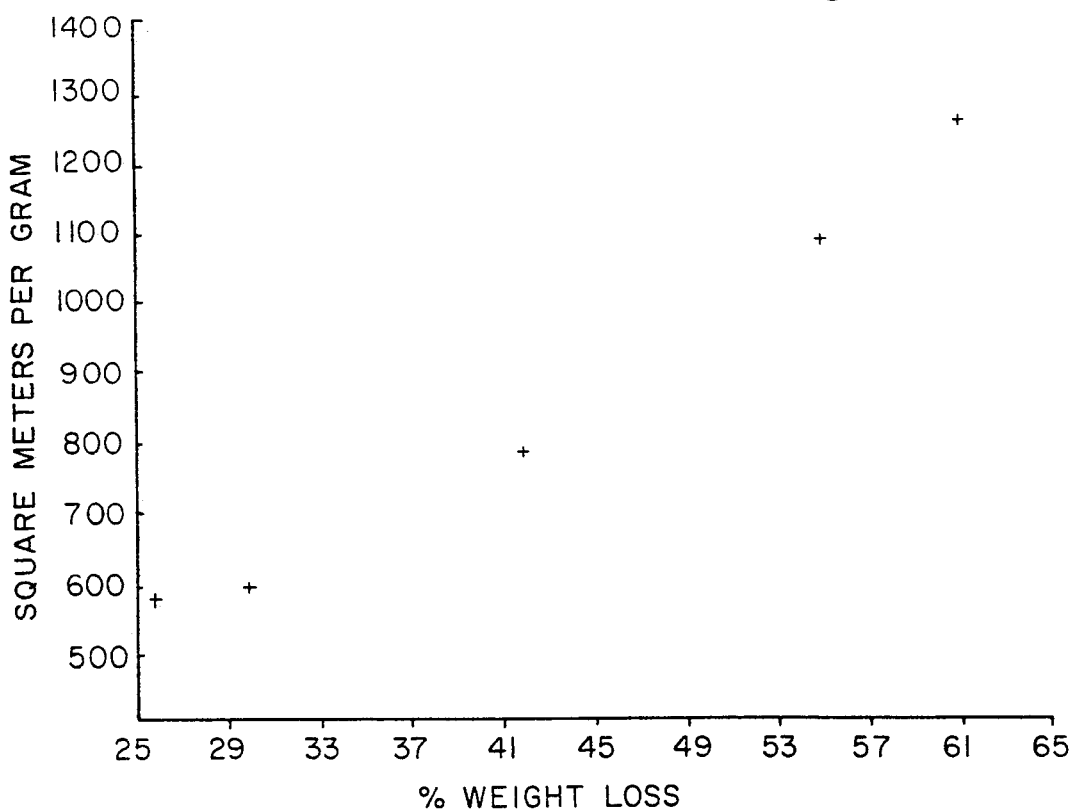
FIG. 14 illustrates the BET surface area of a sample treated as discussed in Example 2, in square meters per gram of the sample as a function of the percentage weight loss of the sample.
Figure 15:
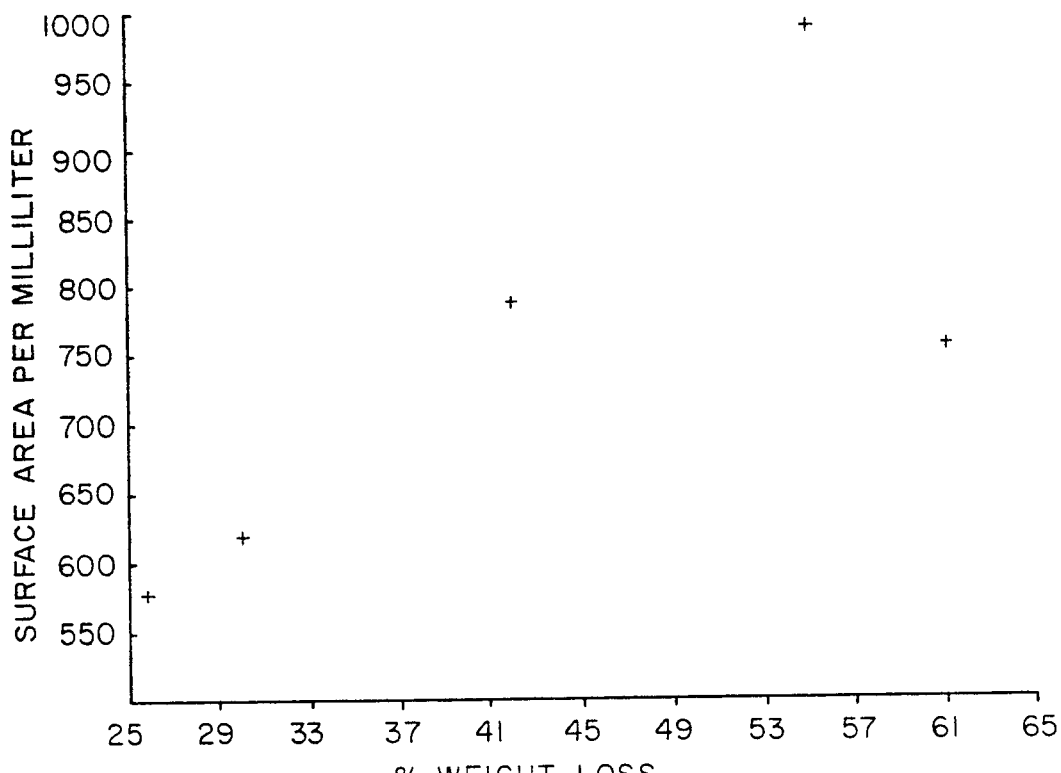
Figure 16:
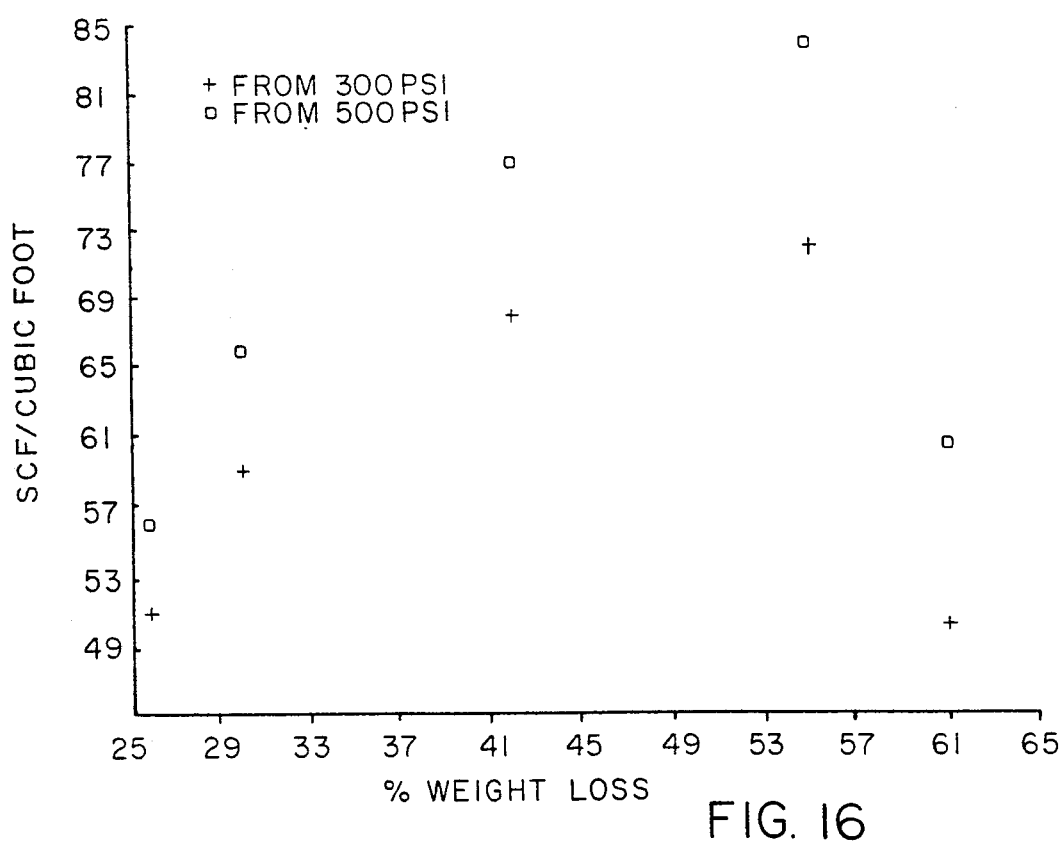
FIG. 16 illustrates the adsorption of methane in standard cubic feet per cubic foot of a sample treated as discussed in Example 2 from a 300 psi methane source and from a 500 psi methane source as a function of percentage weight loss of the sample.

The BET surface area of the coal per unit mass increased linearly with weight loss (see FIG. 14), but FIG. 15 illustrates that, after 56 cycles and a significant loss in density, the surface area per unit volume decreased substantially. This is also reflected in the methane adsorption data in Table 6, and FIG. 16 illustrates that the loss of predicted methane delivered from the sample follows the same trend.

TABLE 6

Cyclic Activation
Coal
Methane Adsorption

| Treatment | Per Unit Mass grams methane per gram carbon | | Per Unit Volume grams methane per ml carbon | | Predicted Delivery SCF/ft³ | |
| --- | --- | --- | --- | --- | --- | --- |
| | 300 psia | 500 psia | 300 psia | 500 psia | 300 psia | 500 psia |
| 8X-25.8% w/l | 0.048 | 0.052 | 0.048 | 0.051 | 51 | 56 |
| 16X-29.9% w/l | 0.053 | 0.058 | 0.055 | 0.060 | 59 | 66 |
| 26X-30.0% w/l | 0.055 | 0.060 | 0.053 | 0.058 | 60 | 68 |
| 36X-41.9% w/l | 0.058 | 0.064 | 0.058 | 0.064 | 68 | 77 |
| 48X-55.0% w/l | 0.066 | 0.075 | 0.060 | 0.068 | 72 | 84 |
| 56X-61.0% w/l | 0.067 | 0.078 | 0.040 | 0.047 | 50 | 60 |

The sample with the highest predicted methane delivery was cycled 48 times. This sample could deliver 72 SCF/cu ft and 84 SCF/cu ft from 300 and 500 psi, respectively. The coal cycled 56 times was visibly more friable and breakdown of its external structure was evident on handling.

Comparing the cyclic activation results for the coal samples to production run prior art, steam activated coal samples from the same source, it appears that a higher density carbon with fewer macropores with the same micropore volume can be produced by cyclic activation from the same starting material. Table 7 illustrates this.

TABLE 7

| | Production run steam activated coal carbon | Cyclically activated coal carbon 48X 55% wt loss |
| --- | --- | --- |
| Piece density g/ml | 0.79 | 0.91 |
| Macropore volume ml/g | 0.50 | 0.40 |
| Micropore volume ml/g | 0.45 | 0.44 |
| Surface area sq m/g | 1068 | 1095 |
| Methane adsorbed | | |
| 500 psi g/g | 0.068 | 0.075 |
| 500 psi g/ml | 0.054 | 0.068 |
| 500 psi SCF/cu ft | 87 | 103 |

This difference in piece density together with the slightly higher adsorption establishes that carbons made by cyclic activation are better adsorbents per unit volume for methane.

EXAMPLE 3

Cyclic Activation of Shaped Carbons

In Examples 1 and 2, peach pits and coal were subjected to the air cycle method of activation. These materials were in monolithic form, but irregularly shaped. These forms are not useful for, for example, packing a cylindrical container. For optimum packing density in a specific volume, the material must be formed in such a way as to reduce voids to the extent possible. The method of shaping these carbons used in these examples has been first to pulverize to a fine powder and then to reform this powder (with or without binder, heat, etc.) into disk shaped pellets.

In these examples, all the materials subjected to preliminary cyclic activation have been in the form of regular pellets. These pellets were all pyrolyzed prior to activation. The materials used included two different Saran carbons, one produced from the homopolymer, Saran A, and the other from a copolymer, Saran 415, available from Dow Chemical Company. Both of these polymers pelletize readily to form solid materials.

Some natural product carbons were also shaped and subjected to cyclic activation. Two different types of 100% peach pit pellets were produced. The major difference in the production of these two types was the temperature of pelletization. Those pellets which were pressed at 110° C. are designated the L series and those pressed at 160° C. the N series. The L series, when made, had a lower bulk density than the N series. Both of these carbons were cycled to see if the initial density differences of the materials had an effect on the resulting weight loss and pore development.

Cherry stone carbon pellets were also cycled to a total of twelve times (12×). These pellets contained no binder and had a high bulk density after pelletization at 120° C. and subsequent pyrolysis.

Saran Carbon

Carbon produced from Saran homopolymer has previously been well characterized. Typically the carbon has a BET surface area of 1000 square meters per gram and a bulk density between 1.1 and 1.2 g/mL.

A single well formed pellet was cycled along with other samples. The pellet was monitored at various stages of the cycling for piece density and weight loss. After thirty six cycles the pellet was removed and fully characterized. The density and porosimetry results are listed in Table 8. The initial carbon contained very few macropores and only a small increase in macropore volume was observed even after considerable weight loss. The bulk density of the carbon decreased to 0.86 g/ml.

TABLE 8

Cyclic Activation
Other Carbons

| TREATMENT | PIECE g/ml | DENSITIES 1 ATMOS. g/ml | 60000 psi g/ml | TOTAL MACROPORE and MESOPORE VOLUME ml/g | MACROPORE VOLUME >500 A° ml/g | MESOPORE VOLUME 500-30 A° ml/g |
| --- | --- | --- | --- | --- | --- | --- |
| Saran A Carbons | | | | | | |
| Not cycled | 1.08 | 1.12 | 1.20 | 0.08 | 0.08 | 0.00 |
| 8X-27.8% w/l | 1.13 | | | | | |
| 16X-30.9% w/l | 0.92 | | | | | |
| 26X-37.0% w/l | 0.87 | | | | | |

TABLE 8-continued

| | Cyclic Activation Other Carbons | | | | | |
|---|---|---|---|---|---|---|
| | | DENSITIES | | TOTAL MACROPORE and | MACROPORE VOLUME | MESOPORE VOLUME |
| TREATMENT | PIECE g/ml | 1 ATMOS. g/ml | 60000 psi g/ml | MESOPORE VOLUME ml/g | >500 A° ml/g | 500-30 A° ml/g |
| 36X-42.5% w/l | 0.82 | 0.86 | 0.97 | 0.14 | 0.08 | 0.06 |
| 12X-17.9% w/l | 0.92 | 1.00 | 1.09 | 0.08 | 0.04 | 0.04 |
| Saran 415 Carbons | | | | | | |
| Not cycled | 1.05 | 0.91 | 1.18 | 0.26 | 0.17 | 0.09 |
| 12X-24.4% w/l | 0.88 | 0.88 | 1.10 | 0.22 | 0.14 | 0.08 |
| Peach Pit Pellets | | | | | | |
| N Series | | | | | | |
| Not cycled | 1.17 | | | | | |
| 12X-19.0% w/l | 1.07 | 0.98 | 1.22 | 0.20 | 0.17 | 0.03 |
| 24X-31.4% w/l | 0.96 | 0.96 | 1.21 | 0.21 | 0.18 | 0.03 |
| L Series | | | | | | |
| Not cycled | 1.00 | | | | | |
| 12X-18.7% w/l | 0.91 | 0.84 | 1.21 | 0.36 | 0.33 | 0.03 |
| Cherry Stone Pellets | | | | | | |
| Not cycled | 1.22 | | | | | |
| 12X-14.2% w/l | 1.16 | 1.23 | 1.41 | 0.10 | 0.08 | 0.02 |

Table 9 illustrates the nitrogen isotherm data. This carbon had a much larger surface area both per unit mass and per unit volume compared to the original material. A surface area of 1400 square meters per milliliter is one of the highest observed.

Table 10 contains the methane isotherm data for this carbon, and, again, gains were evident. The predicted delivery of methane from this carbon was 118 SCF/cubic foot and 134 SCF/cubic foot from 300 and 500 psi, respectively.

TABLE 9

| | Cyclic Activation Other Carbons | | | |
|---|---|---|---|---|
| | BET SURFACE AREA $m^2$g | DUBININ MICROPORE VOLUME ml/g | 1 ATMOS. DENSITY Hg g/ml | SURFACE AREA per unit volume $m^2$/ml |
| Saran A Carbons | | | | |
| Not cycled | 1000 | 0.46 | 1.10 | 1100 |
| 36X-42.5% w/l | 1650 | 0.71 | 0.86 | 1415 |
| 12X-17.9% w/l | 1240 | 0.56 | 1.00 | 1240 |
| Saran 415 Carbon | | | | |
| Not cycled | 852 | 0.38 | 0.91 | 775 |
| 12X-24.4% w/l | 1026 | 0.45 | 0.88 | 903 |
| Peach Pit Pellets | | | | |
| N Series | | | | |
| 12X-19.0% w/l | 674 | 0.31 | 0.98 | 660 |
| 24X-31.4% w/l | 990 | 0.43 | 0.96 | 950 |
| L Series | | | | |
| 12X-18.7% w/l | 703 | 0.31 | 0.84 | 590 |
| Cherry Stone Pellets | | | | |
| 12X-14.2% w/l | 530 | 0.23 | 1.23 | 650 |

TABLE 10

| | Cyclic Activation Other Carbons Methane Adsorption | | | | | |
|---|---|---|---|---|---|---|
| | Per Unit Mass grams methane per gram carbon | | Per Unit Volume grams methane per ml carbon | | Predicted Delivery SCF/$ft^3$ | |
| Treatment | 300 psia | 500 psia | 300 psia | 500 psia | 300 psia | 500 psia |
| Saran A Carbons | | | | | | |
| Not cycled | 0.091 | 0.098 | 0.102 | 0.110 | 102 | 114 |
| 36X-27.8% w/l | 0.117 | 0.130 | 0.101 | 0.118 | 118 | 134 |
| 12X-17.9% w/l | 0.104 | 0.113 | 0.104 | 0.113 | 110 | 124 |
| Saran 415 Carbons | | | | | | |
| Not cycled | 0.072 | 0.077 | 0.066 | 0.070 | 68 | 74 |
| 12X-24.4% w/l | 0.086 | 0.092 | 0.076 | 0.081 | 79 | 86 |
| Peach Pit Carbons | | | | | | |
| N Series | | | | | | |
| 12X-19.0% w/l | 0.056 | 0.060 | 0.055 | 0.059 | 56 | 62 |
| 24X-31.4% w/l | 0.066 | 0.073 | 0.063 | 0.070 | 66 | 77 |

TABLE 10-continued

| | Cyclic Activation Other Carbons Methane Adsorption | | | | | |
|---|---|---|---|---|---|---|
| | Per Unit Mass grams methane per gram carbon | | Per Unit Volume grams methane per ml carbon | | Predicted Delivery SCF/ft$^3$ | |
| Treatment | 300 psia | 500 psia | 300 psia | 500 psia | 300 psia | 500 psia |
| L Series | | | | | | |
| 12X-18.7% w/l Cherry Stone Carbon | 0.057 | 0.062 | 0.048 | 0.052 | 49 | 56 |
| 12X-14.2% w/l | 0.043 | 0.047 | 0.053 | 0.058 | 50 | 57 |

Figure 17:
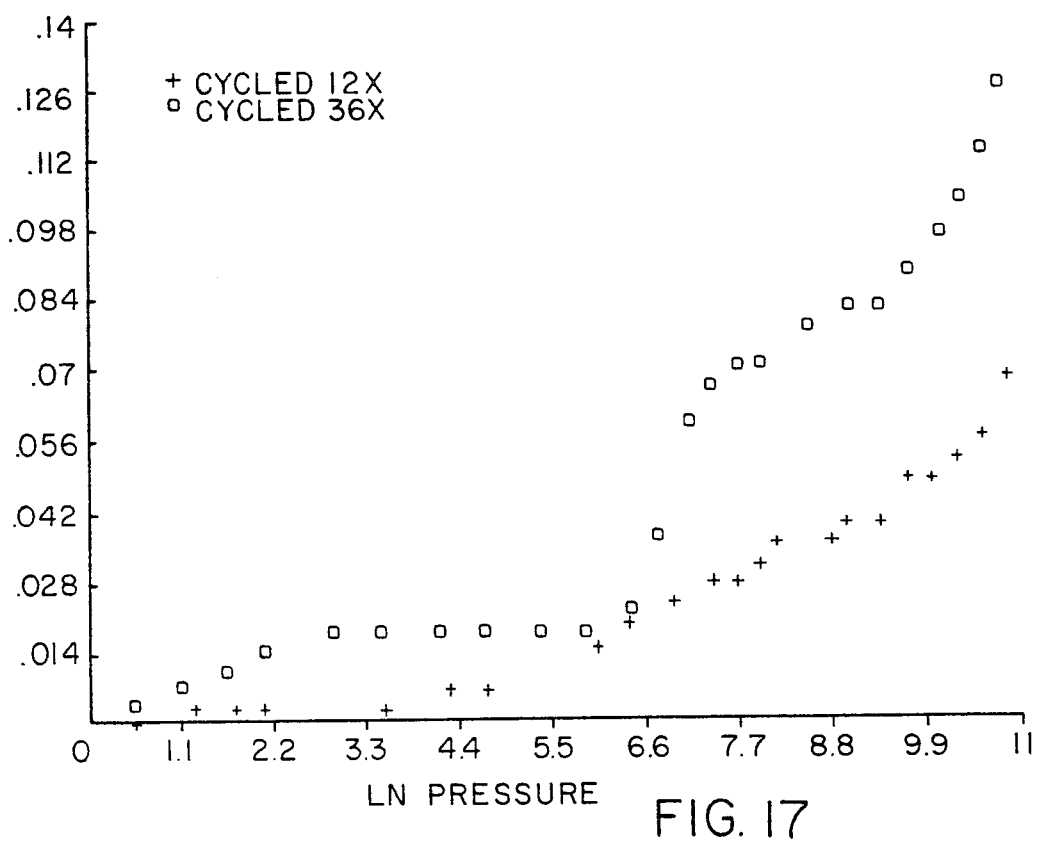
FIG. 17 illustrates mercury porosimetry in cubic centimeters of macropore and mesopore volume per gram of a Saran A carbon sample treated as described in Example 3 as a function of the natural logarithm of mercury pressure after twelve cycles and thirty-six cycles.
Figure 18:
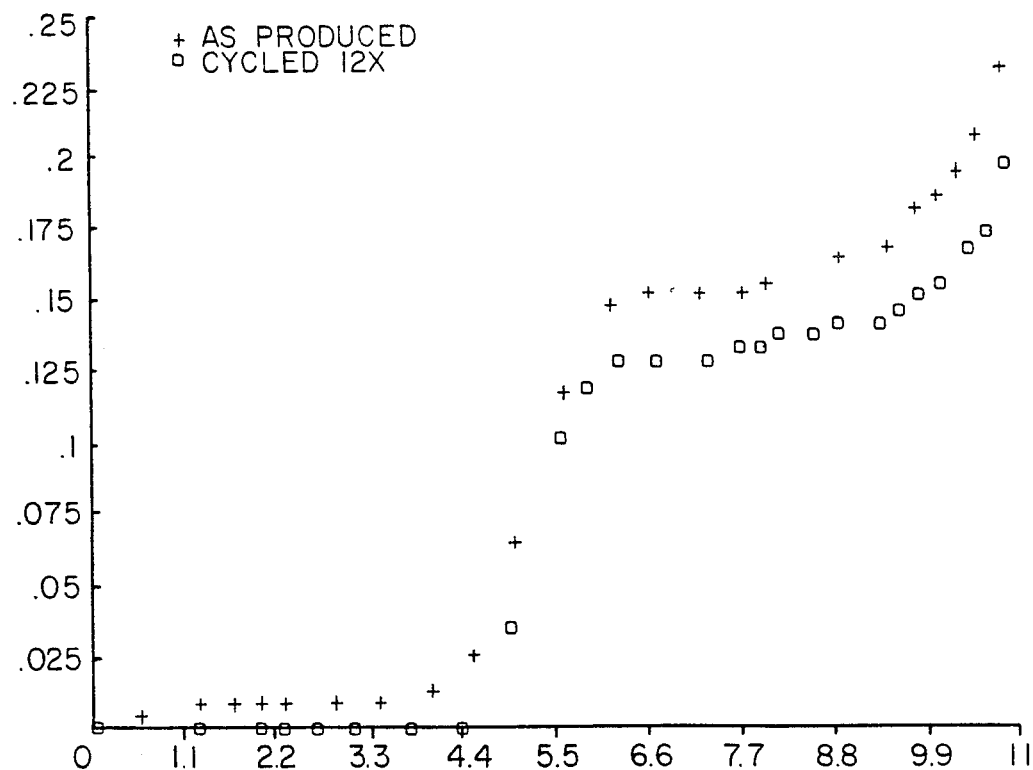
FIG. 18 illustrates mercury porosimetry in cubic centimeters of macropore and mesopore volume per gram of a Saran 415 carbon sample treated as described in Example 3 as a function of the natural logarithm of mercury pressure as produced and after twelve cycles.

Two other batches of Saran carbon were cycled, each for a total of twelve times. One of these was again Saran A carbon and the other Saran 415 carbon. Both showed increases in adsorptive capacity with virtually no increase in macropore volume. The mercury porosimetry plots for the cycled Saran A carbons are illustrated in FIG. 17 and for the Saran 415 carbon in FIG. 18. The complete characterization results are included in Tables 8-10. In these examples, the Saran A carbon performed rather better than the Saran 415 carbon. This was also the case for these carbons before activation.

Peach Pit Pellets

The N and L series peach pit pellets each lost about the same amount of weight after being cycled twelve times (12×). The surface areas and the methane adsorption capacity per gram for both of these carbons were also very similar. The N series carbon, however, retained its higher density and hence the adsorption per unit volume of the N series carbon was higher. This means that this method of activation was not affected by the initial density difference between the two series. The N series carbon was then treated for a further twelve cycles, for a total of twenty four cycles (24×). The macropore volume of this series did not show any significant difference over the series cycled twelve times. This is evident from the mercury porosimetry plots illustrated in FIG. 19. The mercury porosimetry plots for the N and L series carbons after twelve cycles are illustrated in FIG. 20.

Cherry Stone Carbon

The cherry stone carbon was cycled twelve times (12×) and lost about 14% of its mass. The macropore volume of this cycled carbon was very low with little interparticle void. The mercury porosimetry plot is illustrated in FIG. 21. This series maintained a high bulk density but did not show superior adsorption. The predicted delivered methane was close to that of the L series peach pits also cycled twelve times.

Results for all these carbons are in Tables 8-10.

What is claimed is:

1. A process for activating carbon to produce a carbon having a high micropore and a low macropore volume, consisting essentially of conducting multiple times the steps of heating the carbon to a temperature in the range of about 150° C. to about 225° C. in the presence of oxygen for a time in the range of about forty-five minutes to about seventy-five minutes, maintaining the temperature of the carbon while substantially purging the oxygen from the reaction environment, then heating the carbon to a temperature in the range of about 750° C. to about 900° C. in a nitrogen atmosphere for a time in the range of about fifteen minutes to about forty-five minutes.

2. The process of claim 1 wherein the step of heating the carbon to a temperature in the range of about 150° C. about 225° C. in the presence of oxygen for a time in the range of about forty-five minutes to about seventy-five minutes comprises the step of heating the carbon to a temperature in the range of about 180° C. to about 200° C. in the presence of oxygen.

3. The process of claim 2 wherein the step of heating the carbon to a temperature in the range of about 180° C. to about 200° C. in the presence of oxygen for a time in the range of about forty-five minutes to about seventy-five minutes comprises the step of heating the carbon in the presence of oxygen for about an hour.

4. The process of claim 1 wherein the step of heating the carbon to a temperature in the range of about 150° C. to about 225° C. in the presence of oxygen for a time in the range of about forty-five minutes to about seventy-five minutes comprises the step of heating the carbon to a temperature in the range of about 150° C. to about 225° C. in the presence of oxygen for about an hour.

5. The process of claim 1 wherein the step of heating the carbon to a temperature in the range of about 750° C. to about 900° C. for a time in the range of about fifteen minutes to about forty-five minutes comprises the step of heating the carbon to a temperature in the range of about 800° C., to about 850° C.

6. The process of claim 5 wherein the step of heating the carbon to a temperature in the range of about 800° C. to about 850° C. for a time in the range of about fifteen minutes to about forty-five minutes comprises the step of heating the carbon for about thirty minutes.

7. The process of claim 1 wherein the step of heating the carbon to a temperature in the range of about 750° C. to about 900° C. for a time in the range of about fifteen minutes to about forty-five minutes comprises the step of heating the carbon for about thirty minutes.

8. The process of claim 1 wherein the step of maintaining the temperature of the carbon while substantially purging the oxygen from the reaction environment comprises maintaining the temperature of the carbon while exposing the heated carbon to nitrogen.

* * * * *